2,824,845
Patented Feb. 25, 1958

2,824,845

EPISULFIDE COMPOUNDS AND STABILIZED POLYMER COMPOSITIONS CONTAINING SAME

Milton Kosmin, Dayton, Ohio, assignor to Monsanto Chemical Company, St. Louis, Mo., a corporation of Delaware No Drawing. Application February 26, 1954
Serial No. 412,945

3 Claims. (Cl. 260—23)

This invention relates to novel episulfide compounds which are particularly useful in stabilizing vinyl halide polymers. The invention also relates to a novel process for stabilizing said vinyl halide polymers, and to the stable polymer compositions produced by said process.

Vinyl halide polymers may be utilized for many useful applications in industry due to their wide range of physical properties and their high resistance to oxidation, organic solvents, acids, and alkalies. These polymers find application for example in the production of coating compositions, fibers, films, and in the production of shaped articles by various molding techniques. The industrial use of these polymers is, however, considerably restricted by their tendency to decompose in the presence of heat and light with the liberation of acidic decomposition products. As a result of this decomposition, the polymers become discolored and in many instances lose many of their more desirable physical properties.

It has been proposed to stabilize vinyl halide polymers against this type of decomposition by the addition thereto of various organic and inorganic compounds, but the stabilizing effect of such compounds has not been entirely satisfactory. Many of the suggested compounds have shown some activity in stabilizing the polymers against decomposition by heat, but have shown little or no effect in stabilizing the same polymers against decomposition caused by exposure to light, especially light that is rich in ultraviolet radiation.

I have now found a new and useful class of episulfide compounds which are, inter alia, particularly effective in increasing the resistance of vinyl halide polymers to decomposition by light. This novel class of compounds comprises aryloxypropene sulfides having the formula

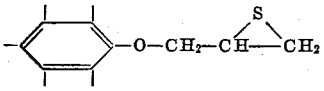

Epoxide compounds have been previously utilized as stabilizers for polyvinyl halide composition, but the present episulfide stabilizers are markedly more effective than the corresponding epoxide compounds.

The present episulfide compounds can be readily prepared by reaction of the corresponding epoxide compounds with a thiocyanate compound, such as sodium or potassium thiocyanate, in accordance with procedures well-known to those skilled in the art (see Journal of the American Chemical Society, 73, page 3444 (1951)). Typical episulfide compounds of the present invention which can be prepared according to this procedure are, for example, 3 - phenoxy - propene - 1,2 - sulfide, 3 - (2,4,6 - trimethylphenoxy)propene - 1,2 - sulfide, 3 - (p-tertiary - butylphenoxy)propene - 1,2 - sulfide, 3 - (2,4 - dimethyl - 6-tertiary-butylphenoxy)propene-1,2-sulfide, ortho-, meta-, and paratolyloxypropene-1,2-sulfides, 3-(p-cetylphenoxy)-propene-1,2-sulfide, 3-pentachlorophenoxypropene - 1,2-sulfide, 3-(dinonylphenoxy)propene-1,2-sulfide, etc. Preferred aryloxypropene sulfides are those in which the substituents on the aromatic ring are selected from the group consisting of hydrogen and halogen atoms and alkyl radicals containing up to about 20 carbon atoms.

The polymeric material to be stabilized by the novel compounds of the present invention can be any of the homopolymers of the vinyl halides, i. e., halogen-substituted ethenoid monomers such as vinyl chloride and vinylidene chloride, and any copolymers containing predominant quantities, e. g., at least 70 percent by weight, of the said vinyl halides. The materials to be copolymerized with the vinyl halides are the polymerizable organic compounds containing at least one olefinic carbon pair ($>C=C<$) in the molecule, such as in vinyl acetate, diethyl fumarate, methyl methacrylate, methacrylonitrile, acrylonitrile, styrene, ethylene, butadiene, allyl alcohol, diallyl ether, divinyl succinate, diallyl phthalate, vinyl benzoate, allyl acetate, diallyl adipate, and the like, and mixtures thereof.

While the present episulfide compounds can be successfully utilized as the sole stabilizing agent in vinyl halide polymers, these episulfide stabilizers can also be utilized very advantageously in combination with other well-known vinyl halide stabilizers, for example, diallyl maleate, cadmium or strontium naphthenates, bis-phenols, diphenyl thiourea, tri-(2-alkenyl)-phosphites such as triallyl phosphite, etc. A particularly effective stabilizer combination is one containing the present episulfide compounds along with fatty acid soaps of group II metals, such as strontium, barium, or cadmium stearates or laurates, or combinations thereof.

The proportion of stabilizer used in the present compositions will generally run between about 0.1 weight percent and about 10 weight percent, and preferably between about 0.5 weight percent and about 5 weight percent of stabilizer, based upon the total weight of composition stabilized.

Other substances which can be, and often will be, incorporated into the compositions of the present invention include substances such as solvents, e. g., hydrocarbons and/or ketones; pigments, e. g., lampblack, titanium dioxide or lead chromate; plasticizers, e. g., dibutyl phthalate, tricresyl phosphate or dioctyl phthalate, etc.

The following is an example of the preparation of one of the episulfides of the present invention.

EXAMPLE 1

3-phenoxypropene-1,2-sulfide was prepared by dissolving 60.5 grams of potassium thiocyanate in a mixture 50 ml. of water and 37.5 ml. of 95 percent ethanol, and adding thereto 37.5 grams of 3-phenoxypropene-1,2-oxide. The liquid was stirred for 4 hours at room temperature, after which an additional 37.5 grams of 3-phenoxypropene-1,2-oxide was added. The stirring was then continued for 5 days at room temperature. At this time there was a solid precipitate at the bottom and an oily layer at the top of the liquid mixture. The oily layer was removed and dissolved in about 100 cc. of ether. The ether solution was thoroughly washed with saturated sodium chloride solution and dried. The ether was then evaporated from the product and the product was distilled to give 3-phenoxypropene-1,2-sulfide having a boiling point of 94°–95°/4 mm.; $n_D^{25}=1.5742$; analysis: sulfur, calculated 19.2 percent, found 18.8 percent.

EXAMPLE 2

Several samples of plasticized polyvinyl chloride films were prepared, with and without various stabilizers, and evaluated in a Weatherometer (light stability) test according to the method described in ASTM tests D–882–46T and E-42-42T. The compositions of the various test films were as set forth in the following table:

*Table*

[Sample compositions, in parts by weight.]

| Sample | Polyvinyl Chloride (Polymer) | Dioctyl Phthalate (Plasticizer) | Ba-Cd Laurates (Stabilizer) | Glycidyl Phenyl Ether (Stabilizer) | Phenoxy Propene Episulfide-1 (Stabilizer) |
|---|---|---|---|---|---|
| I | 100 | 50 | | | |
| II | 100 | 50 | 1 | | |
| III | 100 | 50 | 1 | 1 | |
| IV | 100 | 50 | 1 | | 1 |
| V | 100 | 50 | | 1 | |
| VI | 100 | 50 | | | 1 |

Samples I, II, III, and V all showed appreciable signs of degradation after about 100 hours, thus demonstrating the complete lack of stabilizer action of barium and cadmium laurate and glycidyl phenyl ether. On the other hand, samples IV and VI, each of which contained 1 part by weight of 3-phenoxypropene-1,2-sulfide, showed no sign of deterioration until nearly 300 hours, thus demonstrating the outstanding stabilizing activity of the episulfides of the present invention.

I claim:

1. A composition of matter comprising (1) a polymer of at least 70% by weight of a vinyl halide monomer and from 0 to 30% by weight of a polymerizable organic compound containing at least one olefinic carbon pair ($>C=C<$) and (2) between about 0.5% by weight and about 10% by weight, based upon the weight of said polymer, of an aryloxypropene-1,2-sulfide.

2. A composition of matter comprising (1) a polymer of at least 70% by weight of a vinyl chloride monomer and from 0 to 30% by weight of a polymerizable organic compound containing at least one olefinic carbon pair ($>C=C<$) and (2) between about 0.2% by weight and about 5% by weight, based upon the weight of said polymer, of 3-phenoxypropene-1,2-sulfide.

3. A composition of matter comprising (1) a polymer containing at least 70% by weight vinylchloride monomer and from 0 to 30% by weight of a polymerizable organic compound containing at least one olefinic carbon pair ($>C=C<$), (2) between about 0.2% by weight and about 5% by weight, based upon the weight of said polymer, of 3-phenoxypropene-1,2-sulfide, and (3) between about 0.2% by weight and about 5% by weight, based upon the weight of said polymer, of a fatty acid soap of a metal selected from the group consisting of cadmium, barium and strontium.

References Cited in the file of this patent

UNITED STATES PATENTS

| | | |
|---|---|---|
| 2,094,914 | Dachlauer et al. | Oct. 5, 1937 |
| 2,193,415 | Coltof | Mar. 12, 1940 |
| 2,225,573 | Tendeloo | Dec. 17, 1940 |
| 2,595,636 | Brighton et al. | May 6, 1952 |
| 2,609,355 | Winkler | Sept. 2, 1952 |
| 2,743,290 | Stewart | Apr. 24, 1956 |